United States Patent [19]

Okuo et al.

[11] 4,404,482
[45] Sep. 13, 1983

[54] ELECTRODES FOR MAGNETOHYDRODYNAMIC POWER GENERATION

[75] Inventors: Takayasu Okuo; Kiyonami Takano, both of Yatabemachi, Japan

[73] Assignees: Agency of Industrial Science and Technology; Ministry of International Trade and Industry, both of Tokyo, Japan

[21] Appl. No.: 352,464

[22] Filed: Feb. 25, 1982

[30] Foreign Application Priority Data

Mar. 2, 1981 [JP] Japan ................................ 56-29700

[51] Int. Cl.³ ........................................... H02K 44/10
[52] U.S. Cl. .................................................. 310/11
[58] Field of Search ........................................ 300/11

[56] References Cited

U.S. PATENT DOCUMENTS

| 3,149,247 | 9/1964 | Cobine et al. | 310/11 |
| 3,233,127 | 2/1966 | McKechnie | 310/11 |
| 3,242,354 | 3/1966 | Novack et al. | 310/11 |
| 3,408,528 | 10/1968 | Devine et al. | 310/11 |
| 3,416,013 | 12/1968 | Poncelet et al. | 310/11 |
| 3,508,087 | 4/1970 | Millet et al. | 310/11 |

*Primary Examiner*—Donovan F. Duggan
*Attorney, Agent, or Firm*—Oblon, Fisher, Spivak, McClelland & Maier

[57] ABSTRACT

An electrode for use in the MHD power generating channel comprises unit electrodes which are each formed by bonding a plurality of electrode elements to each other via a resistor in a direction perpendicular to the direction of the flow of combustion gas plasma.

3 Claims, 8 Drawing Figures

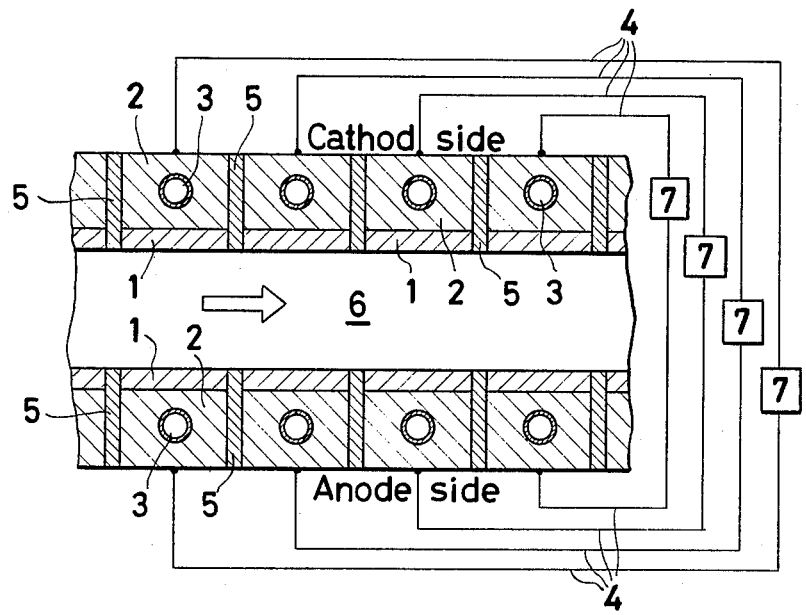
Fig_1 PRIOR ART
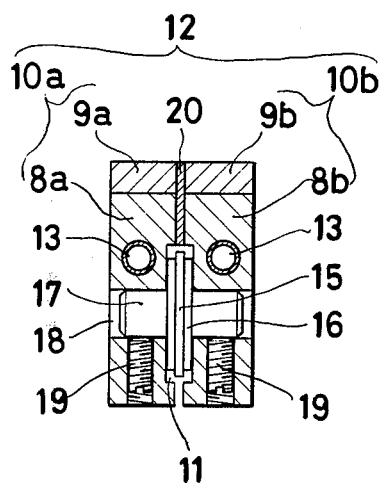
Fig_2
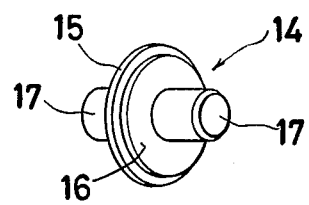
Fig_3
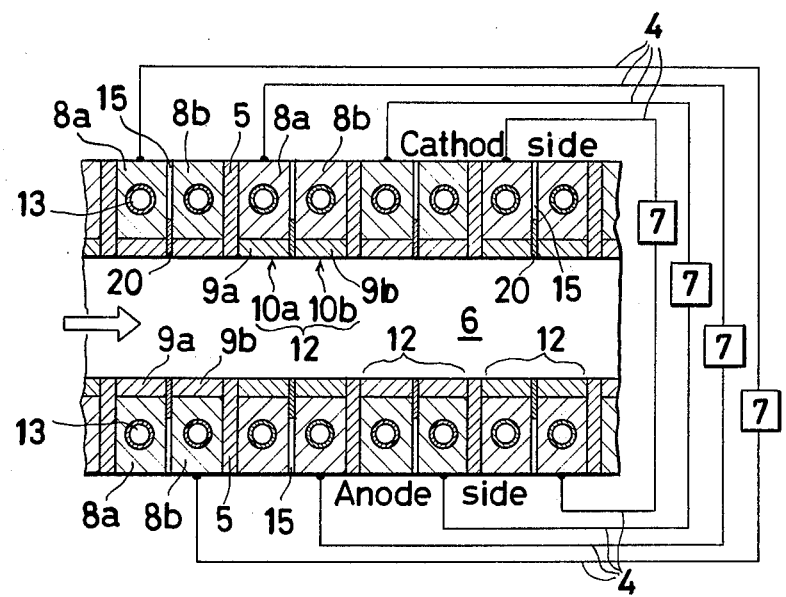
Fig_4

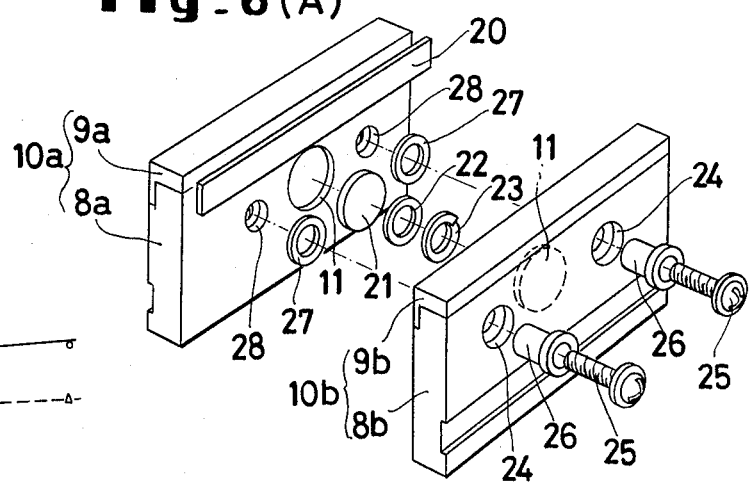
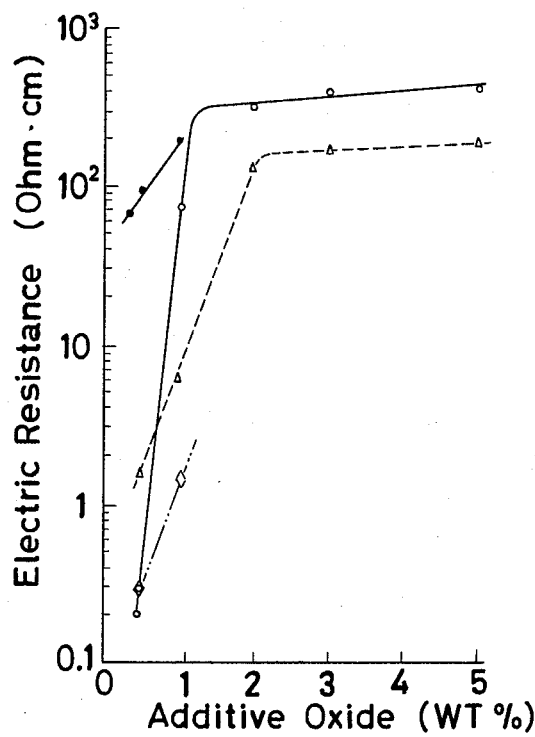
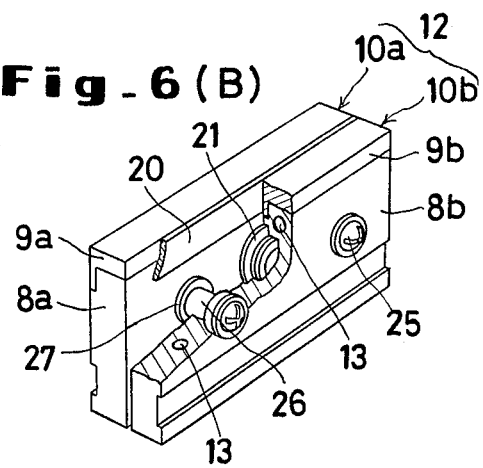
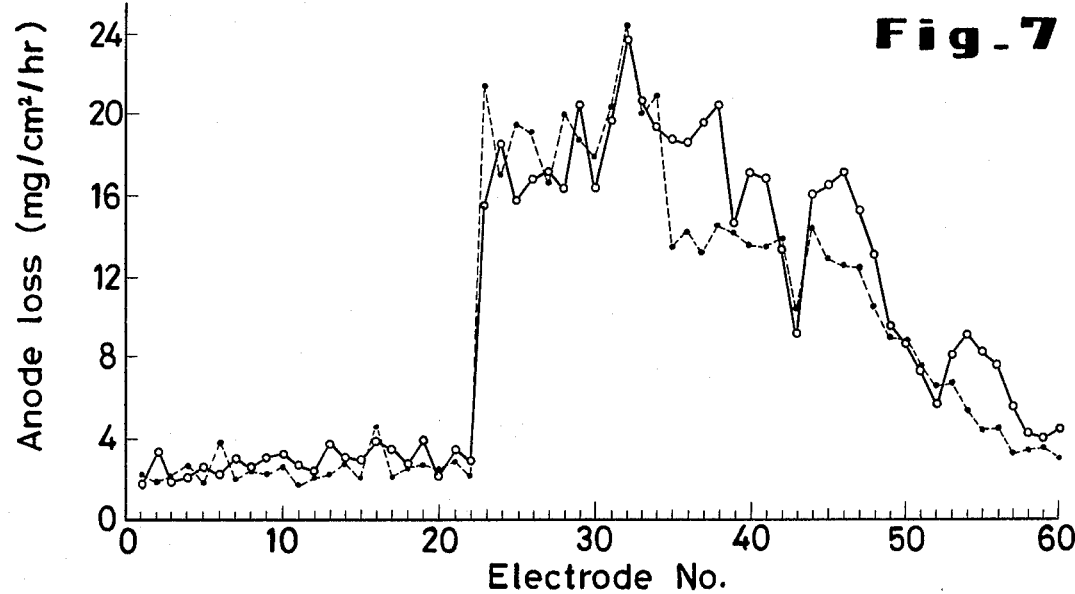

ELECTRODES FOR MAGNETOHYDRODYNAMIC POWER GENERATION

BACKGROUND OF THE INVENTION

This invention relates to an electrode used for a generating channel in the magnetohydrodynamic (MHD) power generator.

The generating channel comprises an electrode wall formed of a multiplicity of electrode modules disposed neatly side by side and an insulating wall formed by disposing a multiplicity of electrical insulation modules neatly side by side. The interior of the generating channel is exposed to a high-temperature combustion gas plasma containing a seed agent and flowing at a very high speed under a high magnetic field. Of the component elements of the generating channel, the electrode wall has direct bearing upon the electric current. The electric characteristics of the electrode wall, therefore, require careful consideration. The service life of the generating channel is governed by the susceptibility of the electrode wall to deterioration and damage. Generally the damage done to the electrode by the electric current is chiefly ascribable to the heat generated by localized distribution of the electric current in the surface region of the electrode. This phenomenon of electric current concentration is closely related to current density and flux density. The tendency toward electric current concentration grows with the decreasing surface temperature of the electrode. When a strong magnetic field of about 5 Teslas (Wb/m$^2$) acts upon an electrode having an average current density of about 1 A/cm$^2$, for example, concentration of electric current occurs in the upstream portion of the anode or in the downstream portion of the cathode. In such a portion, the maximum current density rises above 2 A/cm$^2$. Under the condition of such a high current density, an arc is produced on the cathode side and abnormally localized heat is generated there to vaporize part of the electrode. On the anode side, the heat similarly generated affects the upstream portion of the electrode and causes this portion to be deteriorated and worn out as by oxidation or a chemical reaction. As described, the wear of the electrodes due to the concentration of electric current selectively occurs in terminal portions of the electrodes. The service life of the electrode wall, accordingly, is determined by the speed at which the wear proceeds in such terminal portions. For the service life of the generating channel to be prevented from being shortened by the local wear of the electrode, it is necessary that the distribution of electric current in the surface region of the electrode should be uniformized so as to average the distribution of the wear of the electrode. Realization of this requirement can be expected to ensure a notable elongation of the service life of the electrode wall. Thus, an acute need has been felt for the development of electrode design and material which provide required uniformization of the distribution of electric current in the electrode.

Recently there has been proposed a construction such that the uniformization of electric current on the electrode is promoted by distributing the surface temperature of the electrode in the direction of the flow of the combustion gas, selectively setting the surface temperature of the portion of the electrode not liable to concentration of electric current at a higher level than in the other portion thereby facilitating the reception of electric current in the selected portion, and consequently lowering the current density in the portion liable to concentration of electric current (AIAA Journal, Vol. 15 No. 1, Jan. 1976, pp 116–117). With this construction, however, the uniformization of the distribution of electric current is obtained only to a limited extent. Moreover, good matching between the distribution of electric current and that of surface temperature can be obtained only by a complicated process of trial and error.

SUMMARY OF THE INVENTION

An object of this invention is to provide an electrode for MHD power generation, which is capable of avoiding local wear.

To accomplish the object described above according to this invention, there is provided a unit electrode which is obtained by disposing a plurality of electrode elements of a prescribed thickness neatly side by side in a direction perpendicular to the direction of the flow of the combustion gas plasma and bonding these electrode elements to each other through the medium of a resistor. The distribution of electric current in the surface region of the unit electrode can be substantially uniformized by forming the unit electrode with a plurality of electrode elements and bonding the individual electrode elements to each other through the medium of a resistor. The unit electrode thus produced, therefore, is precluded from local damage and wear.

The other objects and characteristic features of this invention will become apparent from the further disclosure of the invention to be made hereinbelow with reference to the accompanying drawings.

BRIEF DESCRIPTION OF THE DRAWINGS

FIG. 1 is a plan view of a conventional generating channel for use in the MHD power generator.

FIG. 2 is a cross section of one working example of the unit electrode according to the present invention.

FIG. 3 is a perspective view of a resistor to be used in the preparation of the unit electrode of FIG. 2.

FIG. 4 is a sectioned plan view of a generating channel formed of unit electrodes of this invention.

FIG. 5 is a graph showing the relation between the kind of resistors and the magnitude of resistance obtained of the resistors of this invention.

FIG. 6 illustrates another working example of the unit electrode according to this invention: FIG. 6(A) is an exploded perspective view of the unit electrode and FIG. 6(B) a partially cutaway perspective view of the unit electrode.

FIG. 7 is a graph showing the condition of wear of the electrode wall formed of unit electrodes according to the present invention.

DESCRIPTION OF PREFERRED EMBODIMENT

The inventors continued a devoted study in search for methods and materials capable of uniformizing the distribution of electric current in the electrode for use in the MHD power generator. They consequently discovered that the required uniformization of the distribution of electric current can be accomplished by forming an electrode with a plurality of electrode elements disposed neatly in a direction perpendicular to the direction of the flow of combustion gas, connecting these electrode elements to each other through the medium of a suitable resistor, and leading out the electric current through the electrode element on the farthest downstream side in the case of the anode in which the concentration of electric current occurs on the upstream side or through the electrode element on the farthest upstream side in the case of the cathode in which the concentration of electric current occurs on the downstream side. After a series of further studies, they have now found that a tin oxide ceramic, when used as the resistor mentioned above, permits the value of resistance thereof to be controlled over a wide range by the incorporation therein of a suitable oxide and that the ceramic enables the uniformization of electric current to be obtained over wide ranges of parameters such as intensity of magnetic field and current density which have a bearing on the concentration of electric current. The present invention has issued from this knowledge.

Now this invention will be described specifically below with reference to the accompanying drawing. FIG. 1 illustrates a generating channel conventionally used in the MHD power generator. The channel 6 through which the combustion gas plasma flows (as indicated by the arrow) is formed of two horizontally opposed electrode walls and two vertically opposed insulating walls. When the combustion gas plasma flows inside the channel in the direction of the arrow shown in FIG. 1, the lefthand electrode wall functions as a cathode wall and the righthand electrode wall as an anode wall. These electrode walls are each formed by causing a multiplicity of electrode elements which have electrode plates attached fast one each to blocks 2 of copper or copper alloy containing a cooling water conduit to be arranged neatly side by side and bonded to each other through the medium of an insulation 5. In this arrangement, a current of combustion gas plasma is passed at a high speed through the generating channel and a magnetic field is applied perpendicular to the insulating walls. Consequently, an electromotive force is generated between the opposed electrode walls and the electromotive force thus generated is led out through the lead wires 4 and circulated through and consumed by load resistances 7 inserted in the circuits.

Under the conditions of the power generation described above, the electric current tends to concentrate on the upstream side of gas flow in the case of the anode wall and on the downstream side in the case of the cathode wall. Since heat builds up or arcs occur in these portions, the electrode plates are locally deteriorated and damaged.

FIG. 2 illustrates one embodiment of the unit electrode according to the present invention. A single unit electrode 12 is formed by providing an electrode element 10a having an electrode plate 9a attached fast to a cooling block 8a and containing a recess 11 in one lateral surface of the cooling block 8a and an electrode element 10b having an electrode plate 9b attached fast to a cooling block 8b and containing an identical recess 11 in the lateral surface of the cooling block 8b destined to be opposed to the lateral surface of the cooling block 9a containing the circular recess 11, opposing the two electrode elements 10a, 10b to each other with their respective recesses 11 matched to each other, interposing a binding member 14 made of an electrical resistor 15 between the opposed recesses 11 and consequently the opposed electrode elements 10a, 10b, and bonding the electrode elements 10a, 10b through the medium of the binding member 14. The aforementioned cooling blocks 8a, 8b are each provided with a conduit 13 for the passage of cooling water.

The aforementioned binding member 14 comprises a circular electric resistor 15 of a diameter slightly smaller than the diameter of the aforementioned circular recesses 11, copper discs 16 of a still smaller diameter attached one each to the opposite surfaces of the electric resistor 15, and copper protuberances 17 axially disposed at the centers of the copper discs 16 as illustrated in FIG. 3. The sandwich construction of the aforementioned circular electric resistor and copper discs has a thickness such than when it is set in position in the matched recesses 11, the opposed electrode plates 9a, 9b are prevented from coming into contact with each other. The protuberances 17 have a diameter such that they smoothly fit into holes 18 perforated at the centers of the circular recesses 11.

The opposite protuberances 17 of the binding member 14 constructed as described above are inserted into the holes 18 of the cooling blocks 8a, 8b. The two electrode elements are matched to each other so that their electrode plates 9a, 9b fall flush with each other and the copper discs 16 come into intimate contact with the inner walls of the recesses 11. Then screws 19 disposed one each in the rear portions of the cooling blocks are tightened. Consequently, the electrode elements 10a, 10b are electrically and mechanically joined to each other through the medium of the resistor 15, to complete a unit electrode 12. In the crevice formed between the electrode elements 10a, 10b, an insulating plate 20 such as of $SiO_2$ is interposed.

An electrode wall as illustrated in FIG. 4 is obtained by sequentially arranging a plurality of unit electrodes 12 of the construction described above neatly side by side with insulating members 5 interposed therebetween.

When two electrode elements of the construction described above are used to make up a single unit electrode, they are to be manufactured in a thickness of about 50 percent of the thickness of an electrode element designed to be used alone to make up one unit electrode. By the same token, when three such electrode elements are used to make up one unit electrode, they can be manufactured in a thickness of about 30 percent of the thickness of the aforementioned sole electrode element. This selection of thickness is the only consideration that is required in the manufacture of electrode elements. No other special technical consideration is needed.

In this specification, what is obtained by attaching an electrode plate fast to a cooling block is called "an electrode element, " what is provided with an integral function of one independent electrode is called "a unit electrode" (and, therefore, where a unit electrode is composed solely of one electrode element, the electrode element and the unit electrode are the same), and what is formed of a plurality of unit electrodes bonded to each other is called "an electrode module" or "an electrode wall."

The electrodes to be used in the present invention may be either of the semi-hot wall type or of the cold wall type, whichever may suit the occasion. They are particularly suitable for MHD power generation carried out under conditions liable to conspicuous occurrence of the concentration of electric current. The number of electrode elements used to make up one unit electrode is to be decided in due consideration of such factors as the dimensions of electrode plates, the structure of the conduits for the passage of cooling water, and the conditions of power generation. When the electrode plates have a side 20 to 30 mm in length (the thickness of the electrode element), for example, it is suitable to use two electrode elements per unit electrode. The resistor which is used as the binding member for the electrical union of electrode elements may be made of any material which provides stable resistance in the presence of a flow of direct current. Tin oxide can be cited as an ideal material which answers this requirement. The magnitude of resistance offered by tin oxide can be adjusted as required by using tin oxide as a matrix and incorporating therein any of the oxides of copper, zinc, zirconium, or titanium in an amount suitably selected in the range of 0.1 to 2 weight percent based on the matrix. The relation between the amount of the oxide thus added to the matrix and the magnitude of electric resistance offered by the matrix is shown in the graph of FIG. 5. In this graph, the blank circles (o) represent the data for copper oxide, the blank triangles (△) those for zinc oxide, the solid circles (●) those for zirconium oxide, and the rhombs (◊) those for titanium oxide. Regardless of which oxide is added, the magnitude of the resistance offered by the resistor is notably varied when the amount of addition is in the neighborhood of 1 weight percent.

One typical method available for the manufacture of the aforementioned resistor comprises pulverizing tin oxide as a matrix and an oxide selected as an additive independently of each other, mixing the resultant oxide powders in the form of a slurry, drying the slurry mixture at about 100° C. for about 50 hours, then pulverizing the dry mass to a particle size of about 50 mesh, compression molding the resultant fine powder, firing the mold at about 1350° C. for two hours, cutting the fired mold to a prescribed shape, and polishing the cut piece.

Since the resistor obtained as described above can be advantageously used at varying temperatures in the range of from room temperature to about 1200° C., it proves highly convenient. Even under the condition involving flow of direct current, it can be used without entailing the phenomenon of degradation.

The magnitude of resistance offered by the resistor during its use is required to be determined with due consideration for the nature of concentration of electric current in the electrode.

Let R stand for the magnitude of resistance of the resistor, and the determination of the magnitude will be generally obtained by the following formula.

$$R = Ex/(jy \cdot W)$$

wherein, Ex denotes the Hall electric field on the axis of flow in the generating channel, jy the current density in the Faraday direction on the axis of flow in the generating channel, and W the distance between the opposed insulating walls.

The setting of the determined magnitude of resistance in the resistor can be effected by either a method which relies on the selection of the mixing ratio of materials being used for the production of the resistor or a method which relies on the selection of the dimensions of the resistor. The resistor may be in the shape of a plate or a bar, for example. The shape of a plate, however, proves more desirable for the resistor in due consideration of the relatively small space available for the insertion of the resistor, the required radiation of Joule's heat, mechanical strength, and the stability of retention.

As described above, the generating channel illustrated in FIG. 4 is formed of unit electrodes each obtained by combining a plurality of electrode elements in the direction perpendicular to the direction of the flow of combustion gas plasma through the medium of an interposed resistor. On the cathode wall side, a lead wire is drawn out of the outermost electrode element on the upstream side of the plasma flow. On the anode wall side, a lead wire is drawn out of the outermost electrode element on the downstream side of the plasma flow. In the presence of a high magnetic field, the combustion gas plasma at an elevated temperature is passed at a high speed through the interior of the generating channel. Consequently, a Faraday's electromotive force is generated between the opposed electrode walls. This electromotive force is delivered to and consumed at the external load 7. Under such a condition of power generation as described above, the distribution of electric current within the generating channel is substantially uniformized because the electrode elements which are susceptible to concentration of electric current are connected to the electrode elements which are not susceptible to concentration of electric current through resistors capable of dispersing the electric current concentration. On the whole, therefore, otherwise possible local degradation and damage of the electrode material can be precluded.

Another embodiment of the construction of the unit electrode according to the present invention will be described below with reference to FIG. 6. Matched circular recesses 11 are formed one each in the opposed surfaces of a pair of electrode elements 10a, 10b, with a circular resistor 21, a washer 22, and a belleville spring interposed between the opposed circular recesses as arranged in the order mentioned. In the electrode element 10b, two circular holes 24 large enough for passage of insulating collars 24 are perforated at positions opposite each other across the aforementioned circular recess 11. In the electorde element 10a, two female screw holes 28 are formed at positions corresponding to those of the circular holes 24 in the electrode element 10b. The insulating collars are set in position inside the circular holes 24. A pair of male screws 25 are passed through the insulating collars and insulating washers 27 and driven into the aforementioned female screw holes 28. Consequently, the two electrode elements 10a, 10b are fastened to each other as electrically insulated from each other. The resistor 21 which intervenes between the two electrode elements, therefore, is pressed by the belleville spring against the inner wall of the electrode element 10a. Thus is obtained a unit electrode 12 having the two electrode elements bonded to each other through the medium of the resistor. Although this embodiment requires a larger number of parts than the first embodiment, it has the advantage that it obviates the necessity for separately producing the binding member as involved in the first embodiment. When a plurality of unit electrodes 12 obtained as described above are sequentially arranged perpendicular to the direction of the flow of gas through the medium of insulating plates 5 similarly to the first embodiment, there is obtained an electrode wall as illustrated in FIG. 4. In this case, resistors which are produced by the method already described can be used.

This invention was tested with an experimental MHD power generation apparatus having a thermal input of 1.5 MW. Now, this working example will be described. The optimum resistance for the resistors under the working conditions of the experimental apparatus was shown in advance to be 3 Ω on the anode side and 7 Ω on the cathode side. Thus, mixtures of tin oxide with 1 weight percent and 1.1 weight percent respectively of zinc oxide were used as the materials for the resistors. These materials were independently molded in the shape of circular plates 20 mm in diameter and 2 mm in thickness, and the circular plates were fired to produce the resistors. To the opposite surfaces of each resistor, circular copper plates 18 mm in diameter and 1 mm in thickness were soldered through the medium of the metallized layer. Further cylindrical copper protuberances 8 mm in diameter and 8 mm in length were axially formed at the center of the circular copper plates. Thus, binding members of the appearance of FIG. 3 were obtained. These resistors were tested for resistance by application of a DC current of 5A. The results were 3 Ω for one type of resistors and 7 Ω for the other type of resistors.

Two electrode elements each obtained by soldering a stainless steel (SUS-304) plate 11.5 mm in length (pitch), 40 mm in width, and 5 mm in thickness to a copper block 11.5 mm in length, 40 mm in width, and 35 mm in thickness were bonded to each other through the medium of the aforementioned binding member having a resistance of 3 Ω to complete a unit electrode for the anode. Separately, two electrode elements obtained similarly except for using Cu-W alloy plates of the same dimensions in the place of stainless steel plates were bonded through the medium of the binding member having a resistance of 7 Ω to afford a unit electrode for the cathode. A multiplicity of unit electrodes for the anode and as many unit electrodes for the cathode were prepared as described above. They were sequentially bonded through the medium of insulating members 5 to assemble an anode wall and a cathode wall as illustrated in FIG. 4. On the anode side, lead wires were drawn out of the electrode elements falling on the downstream side relative to the flow of the gas. On the cathode side, lead wires were drawn out of the electrode elements falling on the upstream side. These lead wires were extended and connected to external load resistances. The two electrode walls were separated by a distance of 50 mm. Cold water was circulated through the conduits formed in the cooling blocks. A magnetic field of 1.8 tesla (Wb/m$^3$) was applied to the generating channel and a combustion gas plasma (about 2800 K.) containing potassium as a seed agent was passed therethrough at a flow rate of 500 m/s for 30 hours. At the end of the test, the electrode plates were measured to determine amounts of wear. The results were as shown below. In the test, the current density was 0.7 A/cm$^2$. For comparison, unit electrodes each obtained by binding two electrodes elements without use of a resistor were similarly tested to determine weight loss in the electrode plates. The results are also shown below.

| Polarity | Electrode No. | Weight loss (g) |
| --- | --- | --- |
| Anode | A6-a | 0.26 |
|  | -b | 0.24 |
| " | A7-a | 0.23 |
|  | -b | 0.34 |
| (Comparison) Anode | A5-a | 0.38 |
|  | -b | 0.22 |

In the table given above, "a" designates electrode elements falling on the upstream side relative to the flow of gas and "b" electrode elements falling on the downstream side. The electrode plates had a weight of 10 g before wear.

From this table, the effect derived from producing a unit electrode by binding two electrode elements through the medium of a resistor is evident. In the case of an A5 unit electrode having two electrode elements joined without use of a resistor, for example, the weight loss of the electrode element A5-*a* due to concentration of electric current on the upstream side was more than 50 percent greater than that of the electrode element A5-*b* falling on the downstream side. In the case of electrode elements of A6, A7 using a resistor, the weight loss was substantially equal between the electrode elements on the upstream side and those on the downstream side.

Then, as illustrated in FIG. 7, unit electrodes for the anode side were formed each by interposing between two electrode elements a resistor (about 7Ω) of a material consisting of 98.5 weight percent of tin oxide and 1.5 weight percent of titanium oxide. By using an insulating plate of SiO$_2$, 60 unit electrodes of the construction described above were sequentially arranged to form an anode wall. The electrode plates and the cooling blocks had the same dimensions as those used in the working example described above. In the electrodes, No. 1 through No. 22, electrode plates made of platinum were used. In the electrodes, No. 23 through No. 60, electrode plates made of stainless steel (SUS-304) were used. In the generating channel thus constructed, power generation was continued for 227 hours under the same conditions as in the working example. At the end of the test, the electrode plates were measured to determine amounts of wear. The total power was 20,834 KW·H and the mean power output was 98.9 KW.

The results were as shown in the graph of FIG. 7. In the graph, the scale on the horizontal axis represents electrode numbers and that on the vertical axis the anode electrode weight loss. The gas was passed in the direction from Electrode No. 60 to Electrode No. 1. The blank circles (o) represent data obtained of the electrode elements falling on the upstream side and the solid circles (●) represent data obtained of the electrode elements falling on the downstream side, respectively relative to the flow of gas. From this graph, it is noted that weight losses in paired electrode plates were substantially equal, showing that local damage and wear were curbed.

As described above, the electrodes of this invention serve to uniformize the distribution of electric current on the surface region of the electrodes and notably curb the damage inflicted by electric current upon the front and lateral sides of the anode and cathode electrodes on the upstream and downstream sides. Thus, they can be expected to add greatly to the service life of the generating channel.

What is claimed is:

1. An electrode constituting a generating channel in the MHD generator and having an anode side and a cathode side, which comprises:
    a plurality of unit electrodes arranged along the direction of the flow of a combustion gas plasma, each of said plurality of unit electrodes being divided into a plurality of electrode elements;
    a plurality of resistors each said resistor for connecting the respective adjacent electrode elements of said plurality of electrode elements to one another;
    leading-out means disposed on the electrode element on the anode side falling on the most downstream side of said plurality of electrode elements relative to the flow of plasma; and leading-out means disposed on the electrode element on the cathode side falling on the most upstream side of said plurality of electrode elements.

2. The electrode according to claim 1, wherein said resistor is formed by using tin oxide as a matrix and adding thereto at least one member selected from the group consisting of copper oxide, zinc oxide, zirconium oxide, and titanium oxide.

3. The electrode according to claim 2, wherein said resistor offers resistance of a value obtained by dividing the value of the Hall electric field of the generating channel by the product of the current density of the generating channel multiplied by the distance between the insulating walls.

* * * * *